United States Patent [19]

Lipton et al.

[11] Patent Number: 4,583,117
[45] Date of Patent: Apr. 15, 1986

[54] STEREOSCOPIC VIDEO CAMERA

[75] Inventors: Lenny Lipton, Pt. Richmond; Lawrence D. Meyer, Mill Valley; David B. Lee, San Rafael, all of Calif.

[73] Assignee: Stereographics Corporation, San Rafael, Calif.

[21] Appl. No.: 631,894

[22] Filed: Jul. 17, 1984

[51] Int. Cl.⁴ .......................................... H04N 13/00
[52] U.S. Cl. ........................................ 358/92; 358/3; 358/146
[58] Field of Search ................. 358/92, 91, 88, 3, 141, 358/142, 146

[56] References Cited

U.S. PATENT DOCUMENTS

| | | | |
|---|---|---|---|
| 3,061,669 | 10/1962 | Leek | 358/142 |
| 3,488,435 | 1/1970 | Eilenberger | 358/146 |
| 3,697,675 | 10/1972 | Beard | 358/3 |
| 3,821,466 | 6/1974 | Roese | 358/92 |
| 3,991,266 | 11/1976 | Baer | 358/92 |
| 3,992,573 | 11/1976 | White | 358/92 |
| 4,266,240 | 5/1981 | Levy | 358/3 |
| 4,286,286 | 8/1981 | Jurisson | 358/92 |
| 4,399,456 | 8/1983 | Zalm | 358/92 |
| 4,523,226 | 6/1985 | Lipton | 358/92 |

OTHER PUBLICATIONS

Masers, C. T., IBM Technical Disclosure Bulletin, vol. 8, #1, 6/65, "Generating A 3-D TV Signal With One TV Camera" p. 134.

Primary Examiner—Howard W. Britton
Attorney, Agent, or Firm—J. William Wigert, Jr.

[57] ABSTRACT

A stereoscopic camera system is disclosed for producing an "over-and-under" format suitable for stereoscopic video transmission and presentation. The stereoscopic camera system utilizes conventional 60 Hz cameras which are slightly modified in order to utilize only half of the horizontal sweep lines to form the respective left and right subfields in the over-and-under format fields.

10 Claims, 23 Drawing Figures

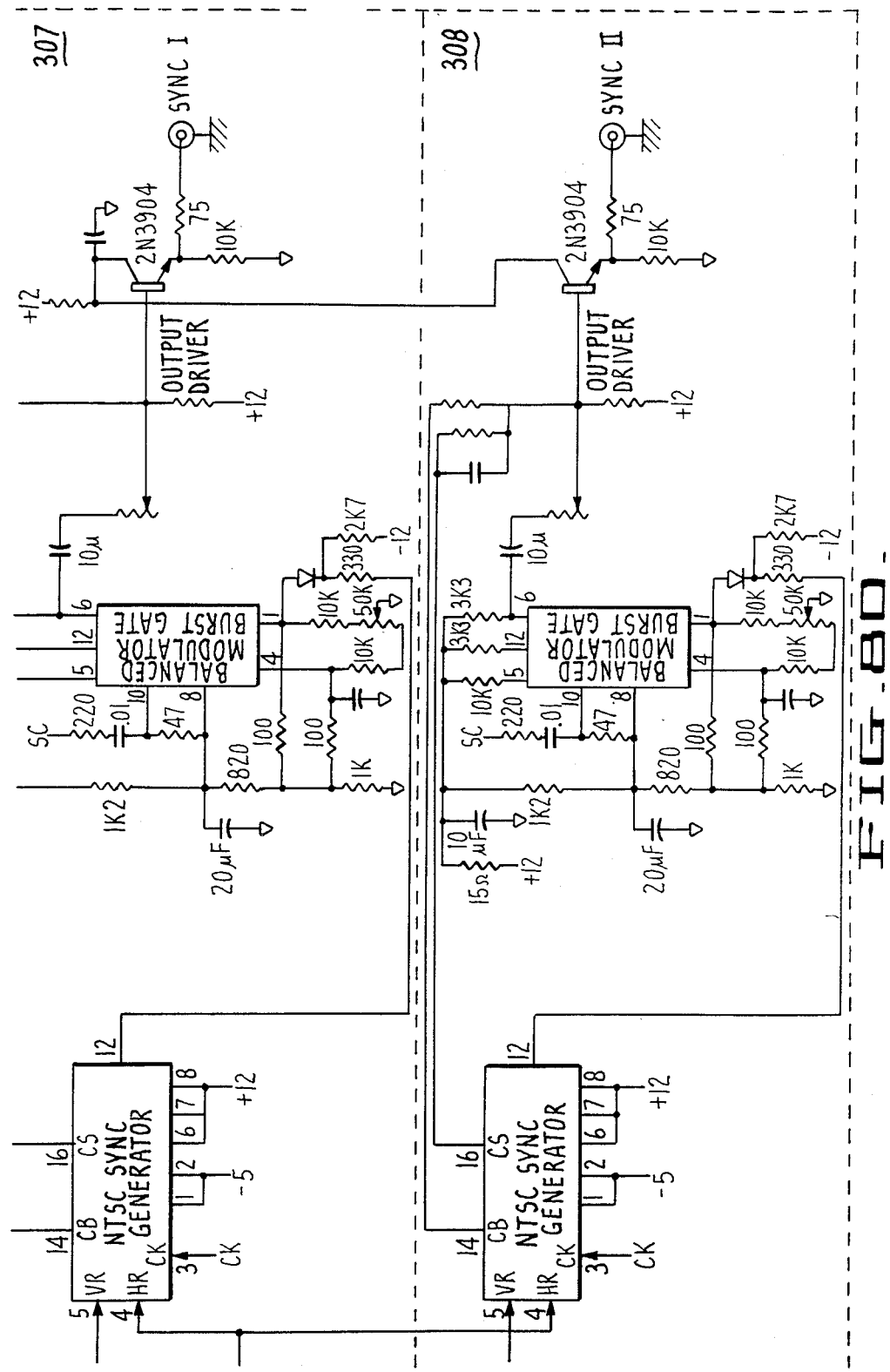

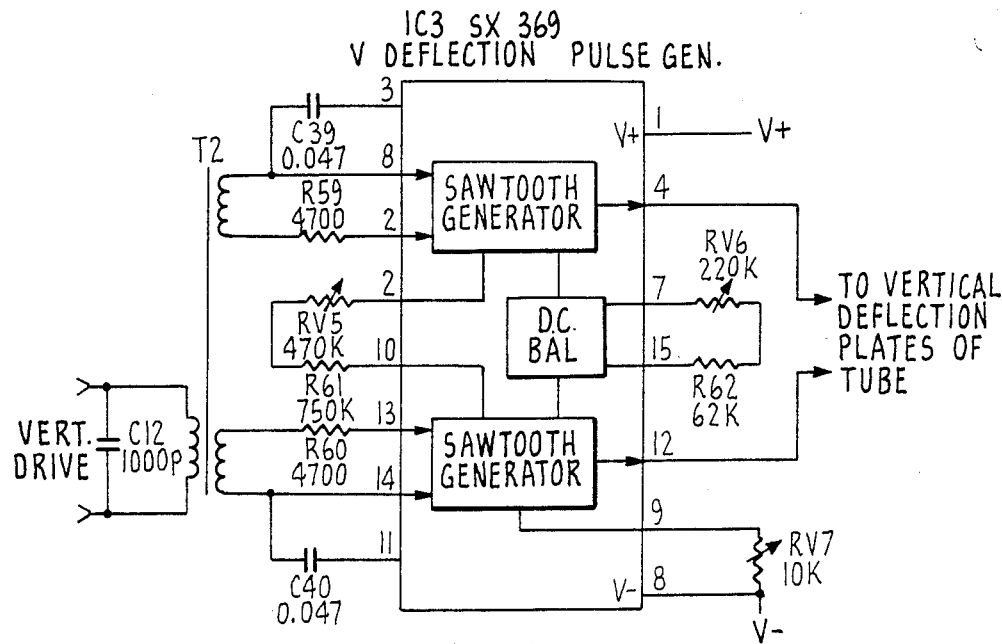
FIG.9.
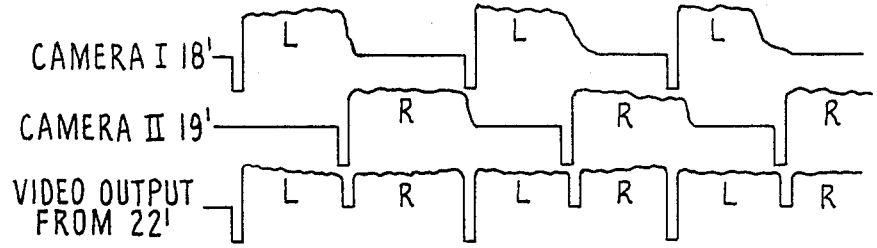
FIG.10.
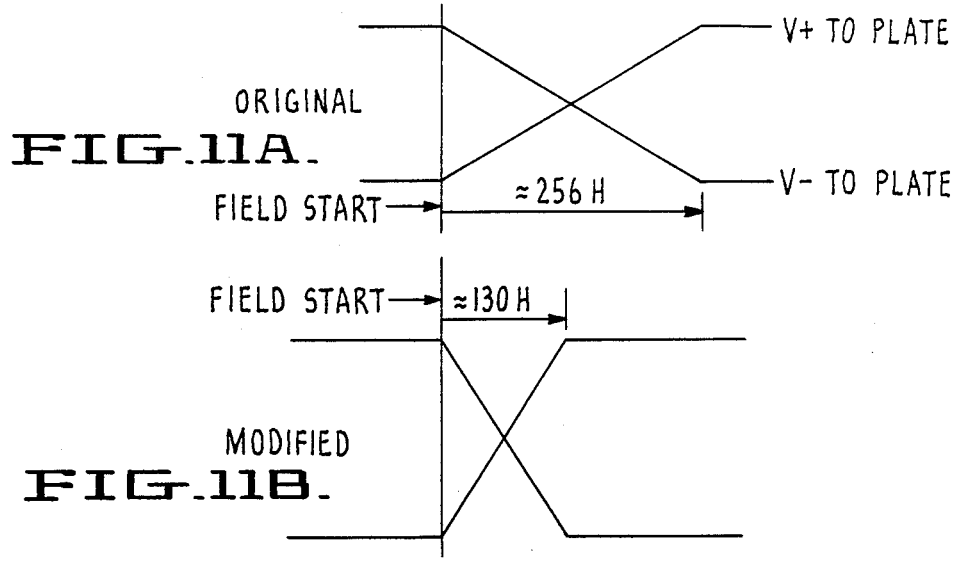
FIG.11A. ORIGINAL
FIG.11B. MODIFIED

STEREOSCOPIC VIDEO CAMERA

TECHNICAL FIELD

This invention relates to an improved stereoscopic video camera system, and more particularly to one which has a great deal of compatibility with the existing commercial television infrastructure requiring only minor modification to existing video cameras.

BACKGROUND ART

U.S. Patent Application, U.S. Pat. No. 4,523,226 filed Jan. 19, 1983 describes a stereoscopic video system which utilizes a standard television field of 262.5 lines but which has two subfields in an "over-and-under" format, one above and the other below, each having 131.25 lines. Each subfield contains an image with the appropriate left or right perspective view. When displayed on a normal 60 Hz monitor the images are anamorphically compressed by a factor of two in the vertical direction, because half the number of lines is scanned for each subfield compared to that which is scanned in a normal field. However, when played back on a 120 Hz monitor, 120 fields per second are displayed, each field having 131.25 lines. Accordingly, when viewing the image through the appropriate selection device, each eye sees 60 fields per second. Since the number of fields per second is above the critical fusion frequency, flicker, which has been evident in prior art systems, is not present.

To accomplish this, left and right cameras which are modified to run at 120 Hz are utilized. When used with the appropriate switching electronics, the cameras produce the "over-and-under" format of 131.25 lines above, and 131.25 lines below. Cameras which produce 120 fields per second are uncommon and, generally speaking, not provided by manufacturers. In order to produce the needed left-right-left-right sequence of fields in one stereoscopic frame within one thirtieth of a second, for a flickerless image, cameras need to be modified for a field rate higher than the usual 60 Hz. This modification is generally simpler for black and white than color cameras, since certain color cameras, especially those with a single tube, are difficult to operate at 120 Hz while producing a good color signal. Such modifications entail the significant expense of conversion and calibration.

SUMMARY OF THE INVENTION

It is therefore an object of the present invention to provide an improved stereoscopic video camera.

Another object of the present invention is to provide an improved stereoscopic video camera which produces 120 video fields per second.

Another object of the present invention is to provide an improved stereoscopic video camera system which utilizes standard video cameras with only minor modifications.

Another object of the invention is to provide an improved stereoscopic video camera system which provides an "over-and-under" field format.

In accordance with the invention, standard 60 Hz left and right video cameras are employed. However, only one-half of the horizontal scan lines, scanned consecutively and containing a complete picture, are utilized from each camera.

In one embodiment, only the scan lines which provide information from the central half of the camera tube (or solid state pickup) light sensitive surface are employed. Only the image which is scanned in the central half of each light sensitive surface of each camera is utilized. In otherwords, the middle 131.25 lines or half the number of lines scanned in each field are employed, and they contain a complete left or right picture view. The other 131.25 lines are unused.

Electronic combining means, external to the respective left and right video cameras, then combine the left and right camera views, each containing one-half of the normal number of horizontal scans, into a single field in the over-and-under format described in co-pending patent application U.S. Pat. No. 4,523,226.

In another embodiment, the entire light sensitive portion of each video camera is used. However, each camera is altered so that only one-half of the normal number of horizontal lines scan the light sensitive portion. To enable only one-half of the horizontal scan lines to traverse the light sensitive part of the camera, it is only necessary to double the slope of the horizontal scan lines by increasing the slope of the vertical sweep. With some cameras this can be done by merely adjusting a gain control knob. But even if this option is not available, it is a simple matter to modify the left and right video cameras to increase the gain.

BRIEF DESCRIPTION OF THE DRAWINGS

FIG. 9 is a schematic diagram of a part of the circuit of a Sony DXC-1800 single tube color camera.

FIG. 10 is a timing diagram for a modified camera system configuration.

FIG. 11A is a signal diagram for the plate voltage of an unmodified Sony DXC-1800 color camera, and FIG. 11B shows the plate voltage for the Sony DXC-1800 color camera modified in accordance with the wave form shown in FIG. 10.

DETAILED DESCRIPTION OF THE PREFERRED EMBODIMENTS

Figure 1A:
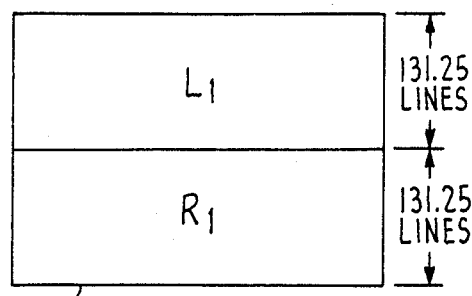
FIG. 1A is a schematic illustration of the first two subfields produced by the left and right stereoscopic cameras of the present invention.
Figure 1B:
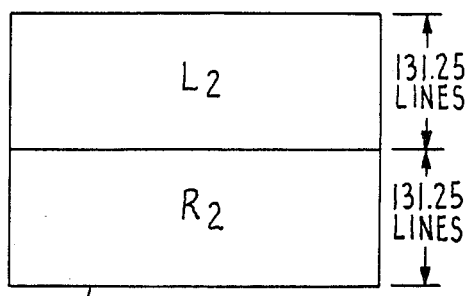
FIG. 1B is a schematic diagram of the second two subfields produced by the left and right stereoscopic cameras of the present invention.

FIGS. 1A and 1B show four successive subfields which make up a pair of video fields 10 and 12, which in turn make up a stereoscopic frame in accordance with the "over-and-under" format described in U.S. Patent Application U.S. Pat. No. 4,523,226. Each of the four subfields $L_1$, $R_1$, $L_2$, and $R_2$ contain 131.25 lines. FIGS. 1A and 1B are essentially timing diagrams, with time in the vertical axis. The vertical blanking areas have been omitted in these schematic representations for didactic purposes.

The four subfields are presented in one thirtieth of a second, or in the time that two 60 Hz video fields are presented. Accordingly, $L_1$, $R_1$, $L_2$, $R_2$ make up one stereoscopic frame. $L_1$ and $L_2$ form an interlaced pair of fields, and $R_1$ and $R_2$ form another when displayed on a 120 Hz monitor, as explained in U.S. Pat. No. 4,523,226.

As is well known in the art, the odd number of lines per frame in the NTSC protocol produces a two-fold interlace; this is because each field contains 262.5 lines. Half a scanned line written at the bottom of one field starts the next scan line for the next field at the midpoint of the first horizontal ine.

Thus, subfields in the stereoscopic "over-and-under" format with a quarter line "leftover" produce a fourfold interlace. This being the case, alternate similar "eyed" subfields, as $L_1$, and $L_2$, for example, have a two-fold interlace. For this reason the fields are presented $L_1$, $R_1$, $L_2$, $R_2$, and not $L_1$, $L_2$, $R_1$, $R_2$. If $L_1$ and $L_2$ followed each other directly, these subfields would not be properly interlaced.

Figure 2A:
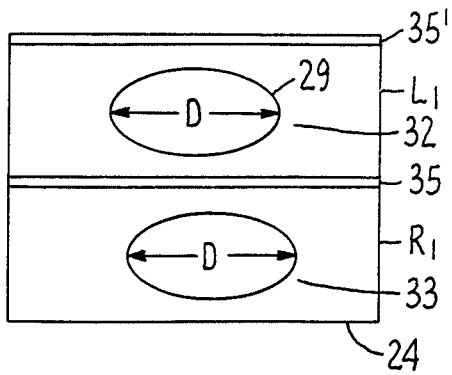
FIG. 2A shows the over-and-under stereoscopic video format from the stereoscopic camera system of the present invention as it appears on an unmodified 60 Hz monitor.
Figure 3A:
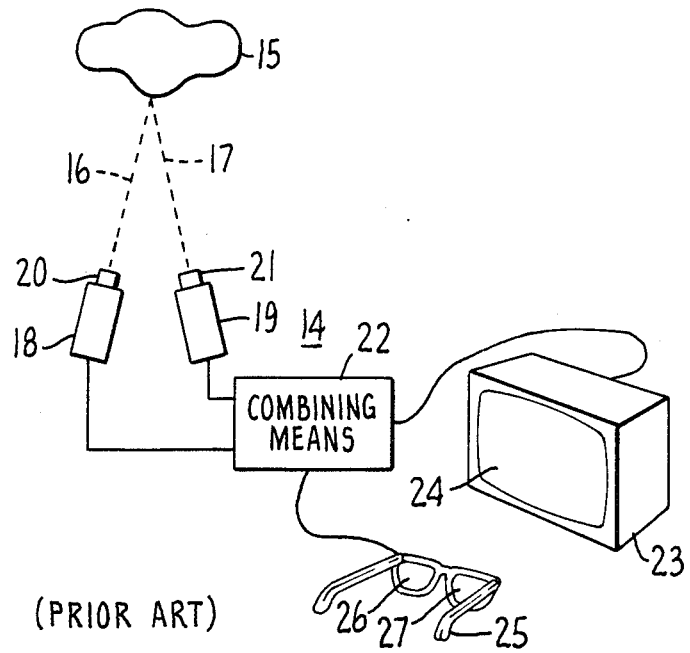
FIG. 3A is a block diagram of the version of the present stereoscopic video camera system described in the patent application cited above.

FIG. 3A shows a camera system 14 as disclosed in U.S. Patent Application U.S. Pat. No. 4,523,226. Left and right stereoscopic cameras 18 and 19 with lenses 20 and 21 respectively, are converged along extended lens axes 16 and 17 on object 15. Each operates at 120 Hz. vertical scan rate. Accordingly, each subfield has 131.25 horizontal lines. The subfields are switched alternately by combining means 22 to form an output video signal with the "over-and-under format" as shown in FIG. 2A and displayed on monitor 23 display screen 24. To provide the stereoscopic effect, the fields are viewed through appropriate selection devices, in this case electro-optical shutters 26 and 27 located in spectacles 25. Shutters 26 and 27 are in synchronization with the subfield rate. The observer views a flickerless stereoscopic image through spectacles 25.

When observed on a standard 60 Hz monitor display screen, the image appears as shown in FIG. 2A. Assume that the picture view is that of a circle. The display screen 24 has an image of an elipse whose horizontal axis is D in each subfield. The images of circles are anamorphically compressed in the vertical direction. Accordingly, the vertical axis of the elipse shown in subfield 32 ($L_1$) is D/2, as it is for the elipse shown in subfield 33.

FIG. 2A shows subfield $L_1$ in the upper half of the image, and subfield $R_1$ in the bottom half of the 60 Hz image. It should be understood that the description given above and to follow could just as well be given in terms of an upper right image and a lower left image.

The vertical blanking area 35 separates the two subfields 32 and 33. The usual 60 Hz blanking area is shown as 35' in FIG. 2A. Added blanking area 35 is the same interval as 35', the usual NTSC field blanking area.

Figure 2B:
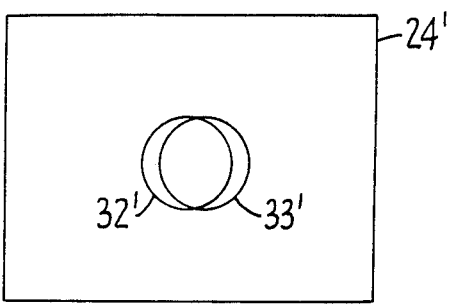
FIG. 2B shows the present stereoscopic video format as it appears on a 120 Hz monitor.

Referring to FIG. 2B, when displayed on a 120 Hz monitor, as described in co-pending patent application U.S. Pat. No. 4,523,226 the screen 24' provides two images (circles) which appear to be nearly superimposed. The images of the left and right circles are shown in subfields 32' and 33', respectively. The images in these subfields are alternately presented so rapidly in sequence that when viewed without the aide of selection device 25 the images appear to be superimposed. When viewed through a selection device 25, subfield 32' is visible through electro-optical shutter 26 while subfield 33' is occluded, and vice versa. This produces a stereoscopic effect to the viewer.

In accordance with the present invention, cameras 18 and 19 operate at 60 Hz, rather than 120 Hz as will now be explained. Two examples of camera systems are described to produce an undistorted image on a 120 Hz monitor screen of the usual aspect ratio, utilizing 60 Hz cameras.

Figure 3B:
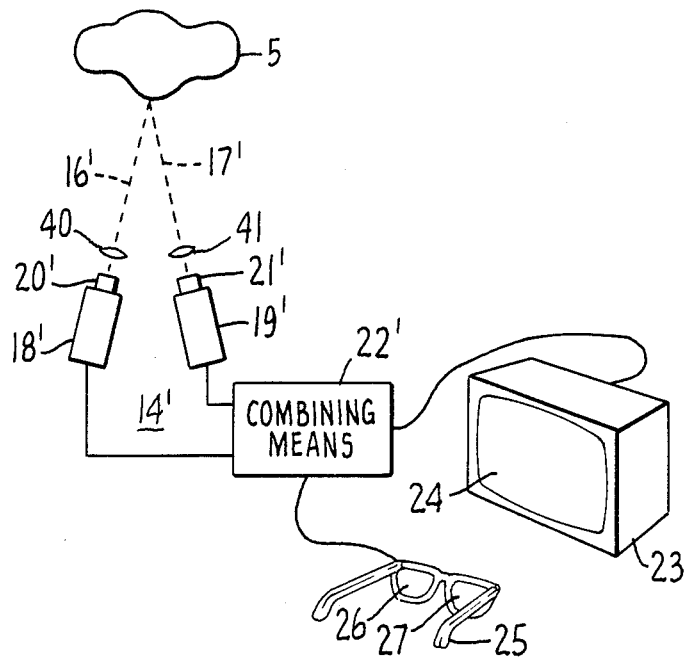
FIG. 3B is a block diagram of another version of the present stereoscopic video camera system, with the camera optical system employing cylindrical lenses.

In FIG. 3B, cylindrical lens elements 40 and 41 are incorporated with lenses 20' and 21' of each of the two 60 Hz cameras 18' and 19' respectively. The cylindrical lenses produce anamorphically compressed images in the vertical direction, to produce subfields 32 and 33 in FIG. 2A. Preferably, the compressed images from the cylindrical lenses 40 and 41 are centered on the light sensitive portion of the respective cameras 18' and 19'.

Figure 4A:
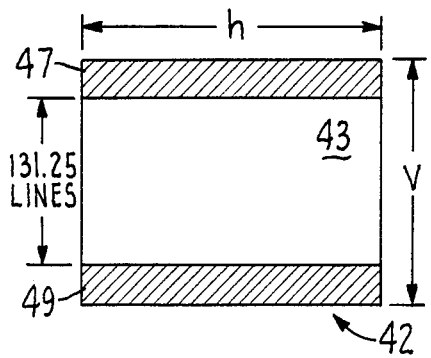
FIG. 4A schematically illustrates the light sensitive surface of the pickup device of a left video camera showing only the central portion scan lines being utilized.
Figure 4B:
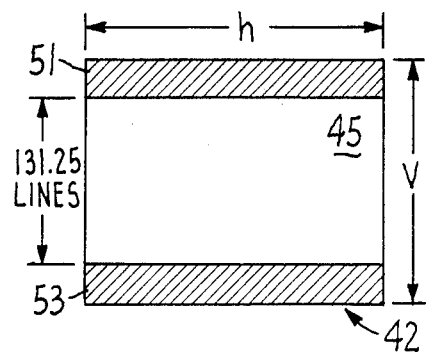
FIG. 4B schematically illustrates the light sensitive surface of the pickup device of a right video camera showing only the central portion scan lines being utilized.

FIGS. 4A and 4B show the light sensitive surfaces 42 of the pick-up devices of the left and right cameras 18' and 19'. The dimension h, is the horizontal extent of the image, and v is the vertical dimension of the image. Accordingly, the aspect ratio is given as h/v. In the case of the usual video system, this is 1.3:1.

In accordance with the present invention, however, only the central portions 43 and 45, each with 131.25 lines, is utilized. The lines scanned in areas 47 and 49, and 51 and 53, are not used. Heretofore 262.5 lines scanned the height. Thus the new height is h/2, and the new aspect ratio is 2 h/v. Combining means 22' then switches at 120 Hz between the two subfields of 131.25 lines each. However, the reader will understand that the aspect ratio of the subfield images is approximately 2.6:1.

Figure 4C:
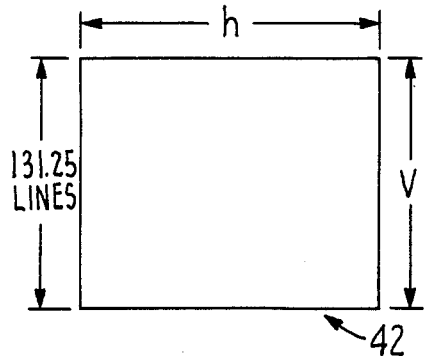
FIG. 4C shows the light sensitive surface of the pickup device of a left video camera after increasing the slop of the horizontal scan lines so that only half the usual number of scan lines traverse this light sensitive surface.
Figure 4D:
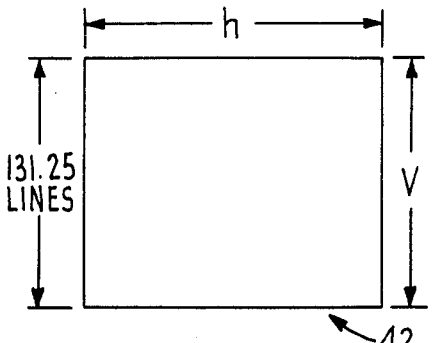
FIG. 4D shows the light sensitive surface of the pickup device of a right video camera modified in the same manner.

Accordingly, the output of 60 Hz cameras 18' and 19', when played on a 60 Hz monitor, produces the images as shown in FIG. 2A. Such vertically compressed images are in complete conformity with the video format described herein, and in U.S. Patent Application U.S. Pat. No. 4,523,226. When such an image is displayed on a 120 Hz monitor, adjusted to produce the full 1.3:1 aspect ratio, the image appears to be properly proportioned. An alternative to cylindrical lenses, which in most cases is preferable because of the optical drawbacks encountered when employing these optics, is now described. The configuration is the same as in FIG. 3B, except as that the cylindrical lenses 40 and 41 are omitted as explained below. FIGS. 4C and 4D, also show the light sensitive surfaces 42 of left and right cameras 18' and 19'. Here, however, no portion of either of the light sensitive surfaces 42 is left unscanned. Instead only one-half, or 131.35 horizontal scans, sweeps the light sensitive surfaces 42. One-quarter of the remaining horizontal sweeps occur above the light sensitive surface 42 and one-quarter below. Neither of these horizontal sweep areas are utilized; they go unused.

The means of accomplishing the foregoing is straight forward. What is necessary is to increase the slope of the horizontal scan lines by a factor of two. With a video camera, this is easily accomplished by increasing the sweep vertical amplitude. On some cameras this is accomplished merely by adjusting existing gain control knobs. In most other cameras this can be accomplished by very simple circuitry changes.

When cameras 18' and 19', operating at 60 Hz, and modified as described above have their video outputs switched through combining means 22' and are displayed on a 60 Hz monitor, the images are anamorphically compressed in the vertical direction by a factor of two as shown in FIG. 2A. When displayed at 120 Hz, on a 1.3:1 aspect ratio screen, a geometrically undistorted stereoscopic image is displayed when viewed through selection device 25 as shown in FIG. 2B.

Operation of the electronic combining circuit 22' for operation without the cylindrical lenses, is now explained. The display shown in FIG. 2A represents a field of NTSC video having a duration of 1/60 sec., which is a video display of a video frame of the output of the combining circuits 22'. The standard vertical interval 35' coupled with picture 32 form the first portion or subfield of a stereoscopic pair. Added vertical interval 35 and picture 33 form the second portion or subfield of the pair.

Thus, the first image must originate in one camera and the second in the other. They will arbitrarily be called left for the first image 32 and right for the second image 33. No loss of generality occurs if the first camera is right and the second left. The first 131.25 horizontal lines come from camera 18' and the combining means 22', comprising a sync generator and switching circuit, then switches to the second camera 19'. The circuit 22' adds the blanking area 35 to the start of the second subfield 30.

The 131.25 horizontal lines from each camera must be centered on both the horizontal and vertical optical axes of the respective lenses 20' and 21'. If the central lines are used without increasing the sweep vertical amplitude, the pattern of FIG. 4A and 4B results. On the other hand, if the raster height is increased, by increasing the sweep vertical amplitude sufficiently to double the horizontal sweep slope, the result is illustrated in FIGS. 4C and 4D. This achieves the desired 2:1 anamorphosis without an anamorphic lens.

It is desirable to utilize a vertically centered image from each camera rather than the top of one and the bottom of the other. This allows the use of standard lenses on each camera.

Figure 5:
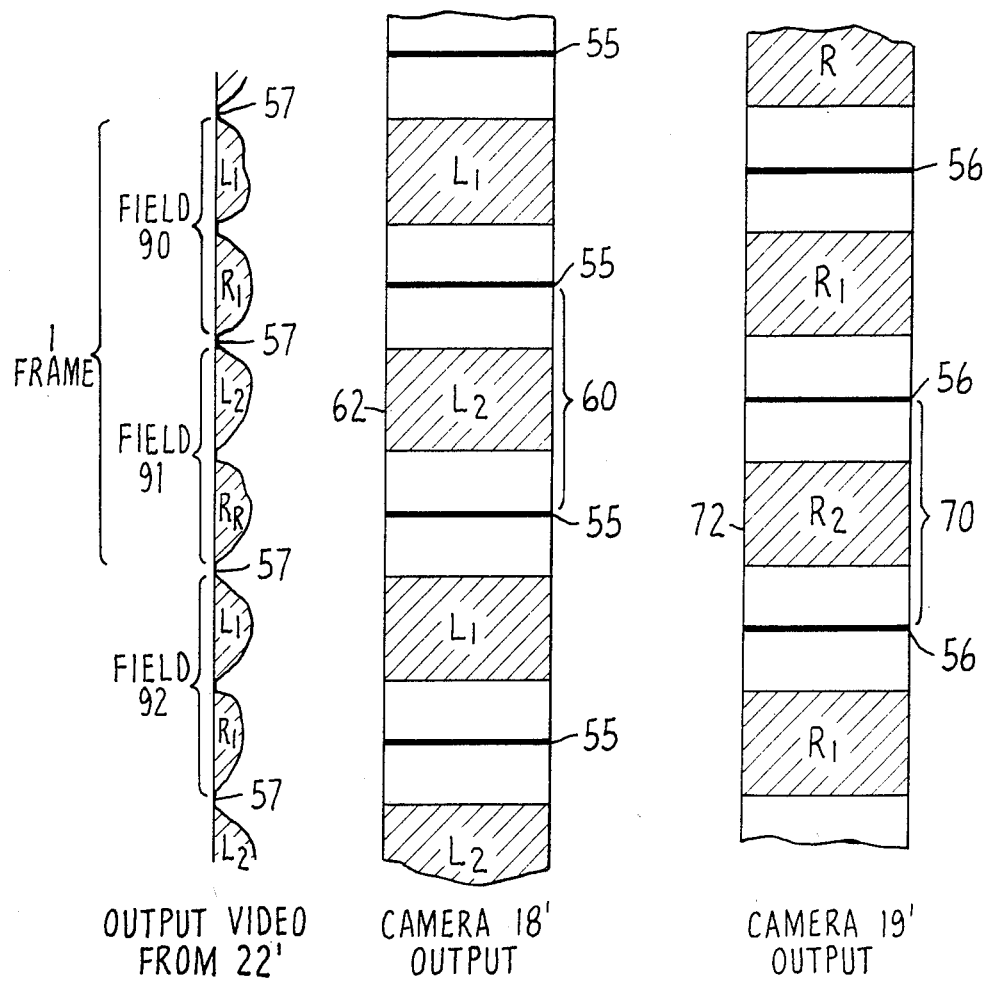
FIG. 5 is a timing diagram showing the appropriate delay for the vertical sync for each camera in relationship to the composite output video signal.
Figure 6:
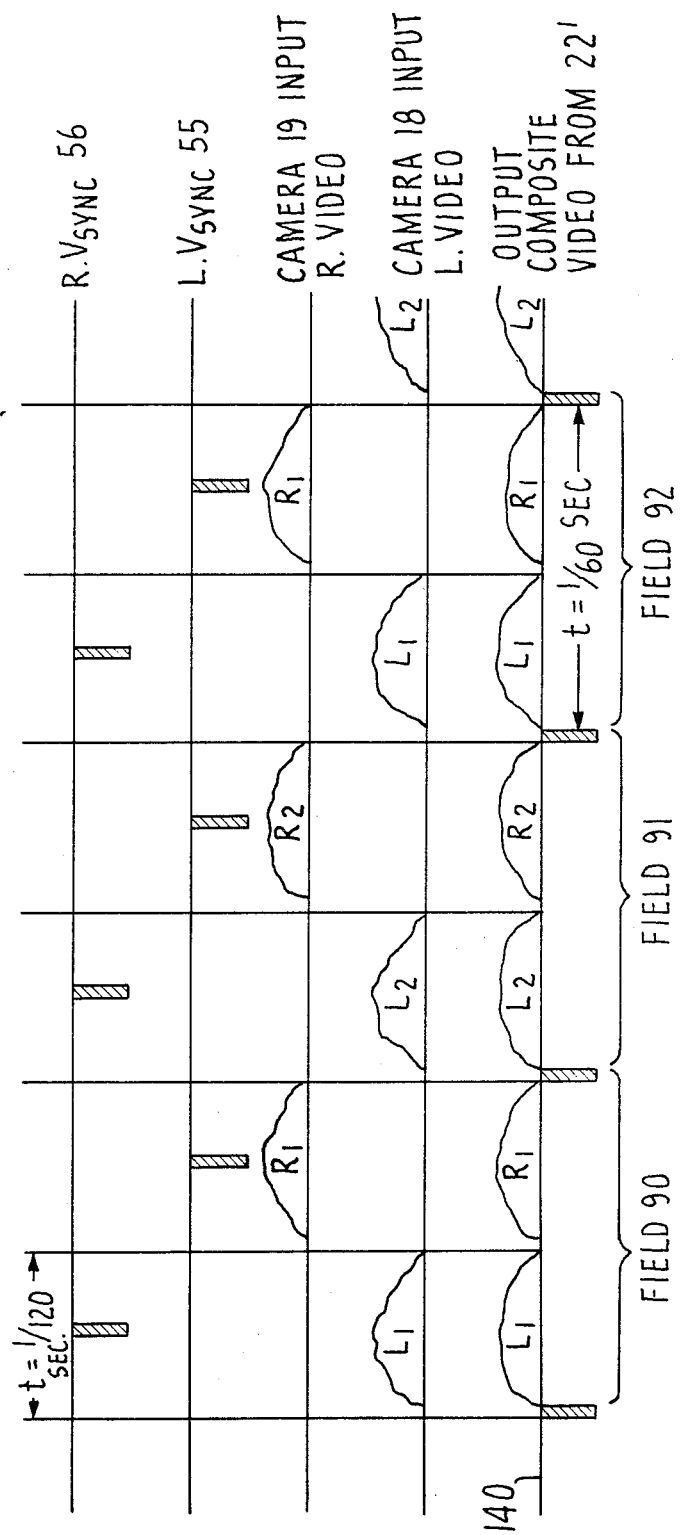
FIG. 6 is a timing diagram of the left and right camera vertical sync and video signals.

In one approach to achieve this result, the vertical sync signal from combining circuit 22' to each camera is delayed a specified amount of time, as illustrated in FIGS. 5 and 6. The left hand column in FIG. 5 represents the output from the combiner circuit 22'. Outputs from the left and right cameras are illustrated in the middle and right hand columns, respectively. Circuit 22' provides vertical sync signals 55 to left camera 18' and vertical sync signals 56 to right camera 19. It also provides the output vertical sync signals 57 at the beginning of each "over-and-under" field.

It can be seen for example, that field 91 having the composite "over-and-under" format is made up of a left hand image $L_2$ taken from the central half 62 of field 60, the photo sensitive area 42 of the left camera 18', as well as a right hand image $R_2$ taken from the central half 72 of field 70, from the right camera 19'. Field 60 must start about ¼ of a field before composite field 91, so that the desired central part 62 starts and forms the upper half of field 91. Similarly, field 70 must start about ¼ field after the beginning of field 91 to form the bottom half of field 91.

Combining circuit 22' generates all three sync signals 55, 56, and 57 to produce these results. All are produced using the same subcarrier generator and horizontal sync to keep all the signals phased together. Only the insertion point of the vertical sync pulses differ. The horizontal sync and blanking burst signals are omitted from FIGS. 5 and 6 for clarity. The end result is a composite video signal 140 that is compatible with existing standards such as NTSC.

Figure 7:
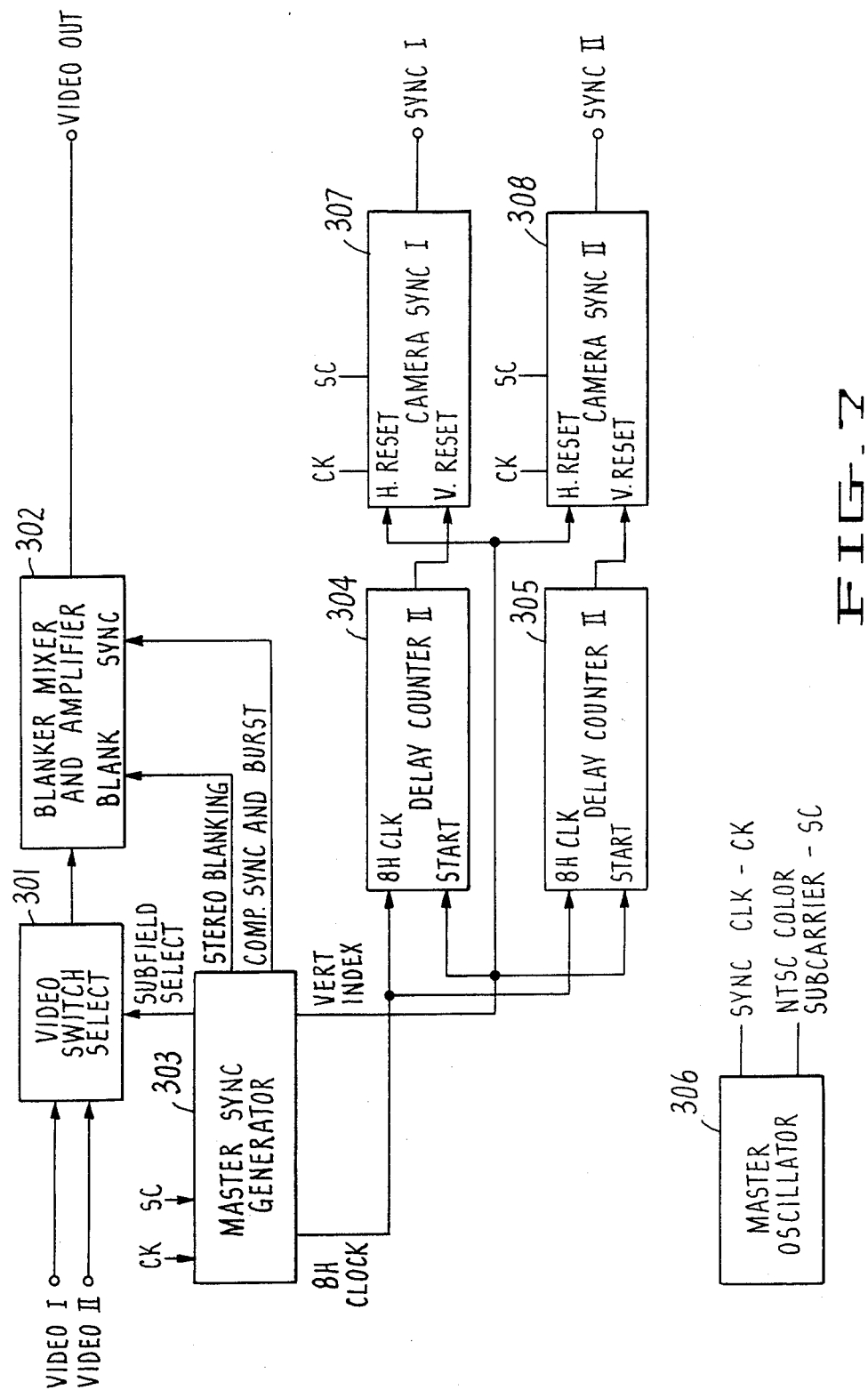
FIG. 7 is a block schematic diagram of the signal combining circuits of FIG. 3A and 3B.
Figures 8, 8E:
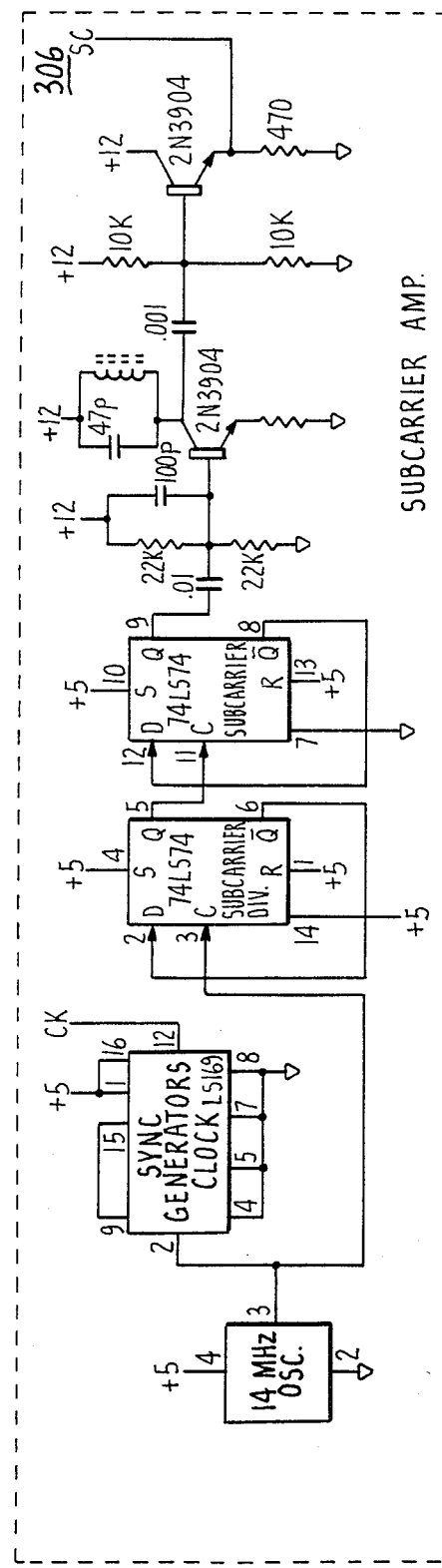
FIG. 8 consisting of FIGS. 8A, 8B, 8C, 8D and 8E, is a detailed schematic of the block diagram of FIG. 7.
Figure 8A:
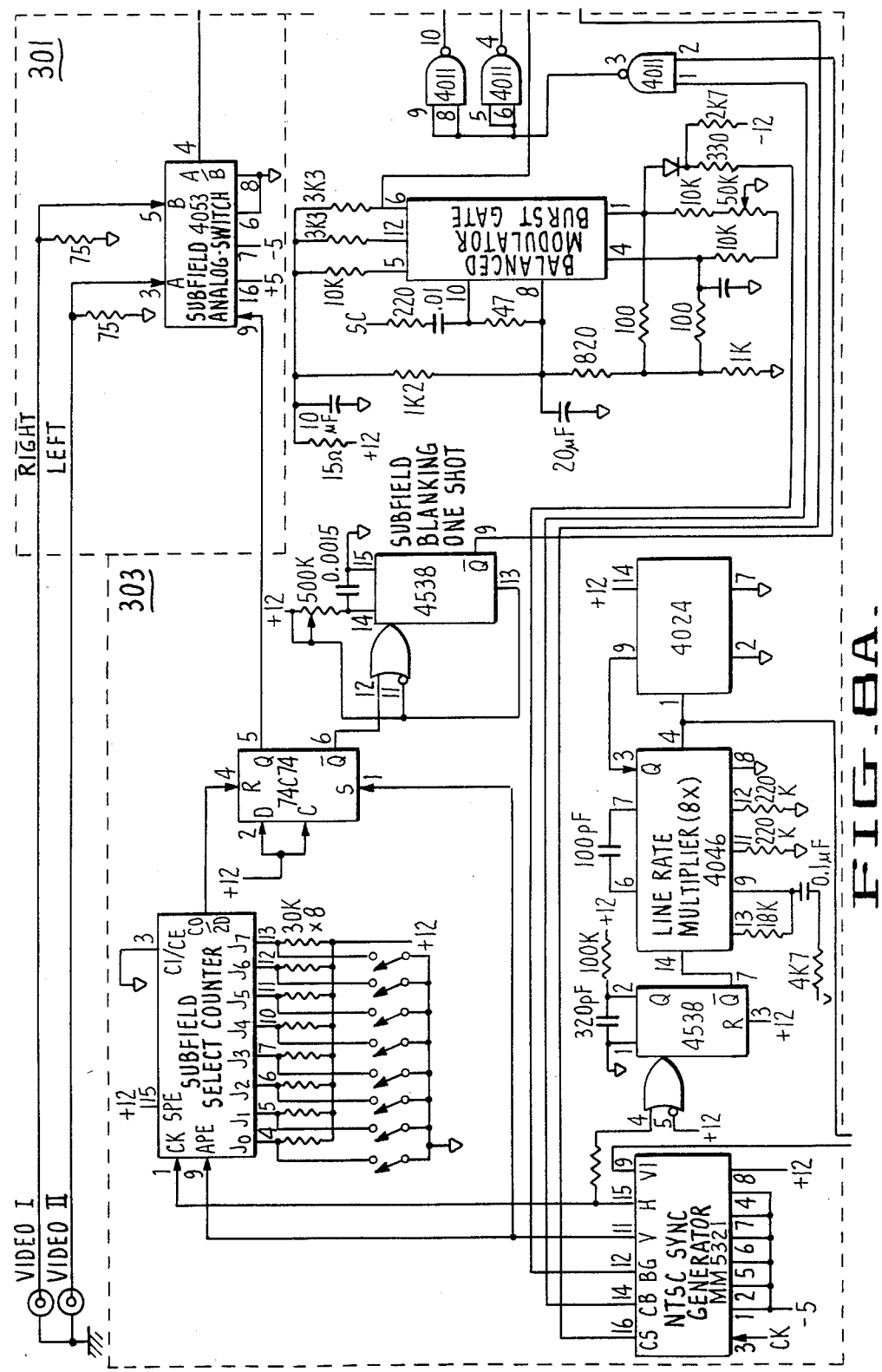
Figure 8B:
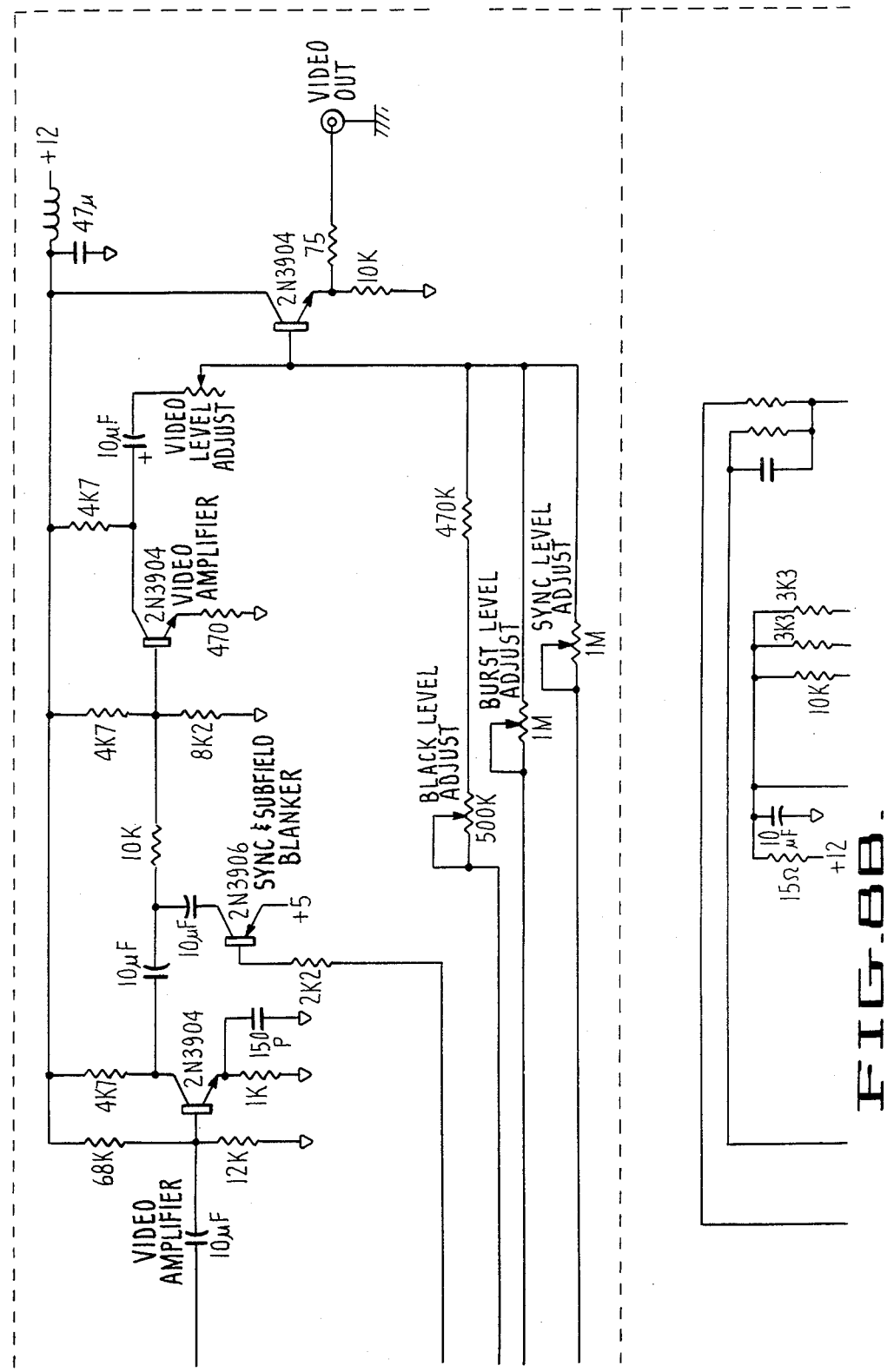
Figure 8C:
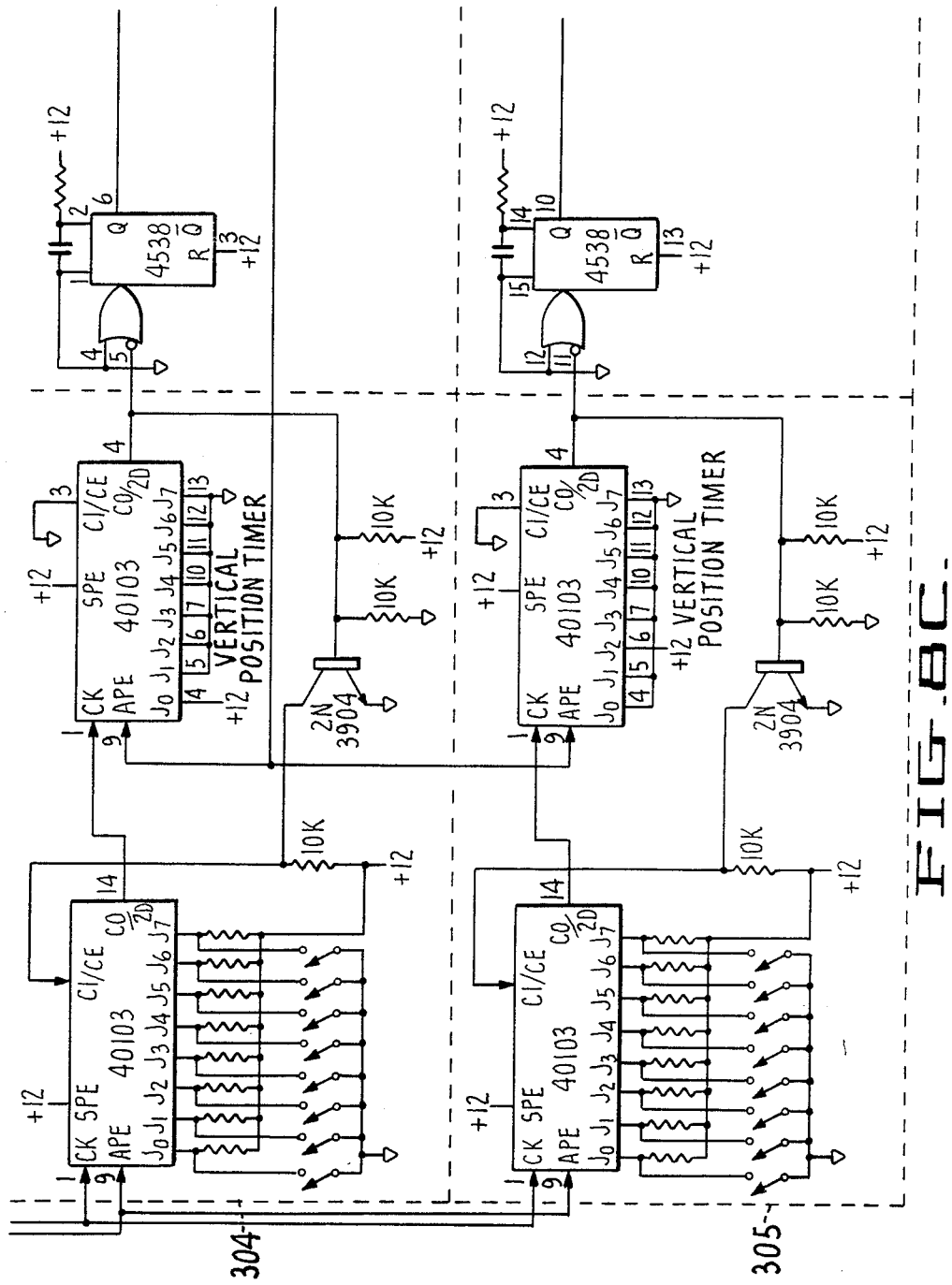

The combining and sync generator network 22' is shown in block form in FIG. 7 and in schematic form in FIG. 8. Master oscillator 306 operates at 14.3818 Hhz, 4 times NTSC burst frequency, and is divided to provide the subcarrier and the master sync generator clock. Master sync generator 303 utilizes a National MM5321 sync generator chip to create the master composite sync, burst and blanking signals. A line rate multiplier utilizes a phase locked loop circuit which serves as an 8 times multiplier from the H sync to create the 8H clock for the delay counter chains 304 and 305 respectively. The vertical index from the MM5321 sync chip starts the delay counters 304 and 305 and they count at 8 times H rate to provide a delay of 174 of the field period for counter 304 and ¾ of the field period for counter 305. These delayed pulses reset slave sync generators 307 and 308 respectively, which provide all the signals needed for the left and right video cameras respectively. The two slave sync chips 307 and 308 are both National MM5321 circuits and share the master clock signal with master sync generator 303 and are thus always in syncronization.

Master sync section 303 provides a subfield select signal to video switch 301 to select the correct camera as a non-composite video source in sync with slave sync generators 307 and 308.

Blanker, mixer and amplifier 302 mixes the multiplexed noncomposite video from video switch 301 with the sync, color burst and blanking signals from master sync generator 303 to produce an NTSC compatible output composite video signal the "over-and-under" format.

FIG. 9 is a schematic diagram of the vertical deflection pulse generator circuit of a Sony Model DXC-1800 single tube color camera. All that is required to provide the doubled slope of the horizontal scan lines is to change the following resistors:

R61 change from 750 Kohm to 180 Kohm
RV7 change from 10 Kohm to 47 Kohm
RV6 change from 47 Kohm to 500 Kohm
R62 change from 62 Kohm to 0 Kohm Another approach to provide the necessary timing to achieve the "over-and-under" format is best understood by reference to FIG. 10 which illustrates the separate and combined output of cameras 18' and 19'. In this embodiment the entire photosensitive area 42 of each camera 18' and 19' is scanned in 8.33 milliseconds one-half the usual time of 16.67 milliseconds. This is illustrated in FIGS. 11A and 11B, which show the change in voltages on the vertical deflection plates of the camera tube over time. The slope of the vertical sweep (FIG. 11A) is doubled (FIG. 11B) and thus the entire image is scanned in ½ the usual time.

Because the entire photosensitive area is used, the quarter, and three-quarter delay offsets of the embodiment shown in FIGS. 5 and 6 are not needed.

Each camera 18' and 19' scans the image in 131.25 lines after vertical sync. The first one-half of the field is provided by camera 18' and the second one-half is provided by camera 19' which is triggered by a delayed vertical sync. Each field is now comprised of first the left image and then the right image which is the desired "over and under" format.

The Sony DXC-1800 single tube video camera is modified to produce the deflection shown in FIG. 11B by a simple change.

Referring to FIG. 9, it is necessary only to change C39 and C40 to one-half the original value i.e. 0.0235 uf, to achieve the scan of FIG. 11B.

The desired 2:1 vertical compression at 60 Hz is inherent because the camera scans the entire image in the time the 60 Hz display would only scan half the screen. Thus ordinary video lenses may be used on the cameras.

It should be understood that while the invention is described in terms of the NTSC protocol, the invention is equally applicable as for PAL, SECAM, or other protocols for both broadcast or non-broadcast applications.

It will also be apparent that the present invention is equally applicable to other types of video cameras, such as charge-coupled video cameras.

We claim:

1. A stereoscopic camera system comprising:
    a left video camera which provides a video field at a standard video field rate and with a standard number of horizontal scans per field;
    a right video camera which provides a video field at a standard video field rate and with a standard number of horizontal scans per field;
    means for generating a complete left picture image in substantially one-half of the horizontal scans, scanned consecutively, of said left video camera;
    means for generating a complete right picture image in substantially one-half of the horizontal scans, scanned consecutively, of said right video camera; and
    means for combining the left and right picture images into a single composite video field of standard video field duration with one of the picture views in the upper half and the other in the lower half of said field.

2. A stereoscopic camera system as in claim 1 wherein each of said picture image generating means provides the respective left and right picture images in the middle sequence of the horizontal scans.

3. A stereoscopic camera system as in claim 2 wherein each of said generating means comprises means for substantially doubling the slope angle of said horizontal scan lines so that substantially only one-half half of said scan lines scan the light sensitive portion of said camera.

4. A stereoscopic camera system as in claim 3 wherein said slope angle doubling means comprises means for increasing the sweep vertical amplitude of each of said cameras.

5. A stereoscopic camera system as in claim 4 wherein said combiningmeans has means for providing a first vertical sync pulse before the upper and lower picture views.

6. A stereoscopic camera system as in claim 5 wherein said combining means provides a second vertical sync pulse for one of said video cameras about one-quarter field before the start of each composite video field and provides a third vertical sync pulse for the other video camera about one-quarter field after the start of each composite video field.

7. A stereoscopic camera system as in claim 1 wherein the standard video field rate is 60 Hz and wherein the standard number of horizontal scan lines is 262.5.

8. A stereoscopic camera system as in claim 1 wherein each of said picture view generating means comprises optical means for compressing the picture by a factor of two in the vertical direction before it is directed at the respective left and right cameras.

9. A stereoscopic camera system as in claim 8 wherein said optical means comprises a cylindrical lense.

10. A stereoscopic camera as in claim 3 wherein each of said generating means comprises means for substantially doubling the slope angle of said horizontal scan lines so that substantially only the first half of said scan lines scan the light sensitive portion of said camera.

* * * * *